United States Patent
Zhang et al.

(10) Patent No.: US 7,016,374 B2
(45) Date of Patent: Mar. 21, 2006

(54) DUAL MODE ISDN S/U INTERFACE CONVERTER

(75) Inventors: Wei Qiang Zhang, San Jose, CA (US); Shih Jih Yao, Singapore (SG); Yeow Fong Tham, Singapore (SG)

(73) Assignee: CET Technologies PTE LTD, Singapore (SG)

( * ) Notice: Subject to any disclaimer, the term of this patent is extended or adjusted under 35 U.S.C. 154(b) by 456 days.

(21) Appl. No.: 10/129,847

(22) PCT Filed: Apr. 16, 2001

(86) PCT No.: PCT/SG01/00062

§ 371 (c)(1),
(2), (4) Date: Jun. 4, 2003

(87) PCT Pub. No.: WO02/084983

PCT Pub. Date: Oct. 24, 2002

(65) Prior Publication Data

US 2004/0004976 A1    Jan. 8, 2004

(51) Int. Cl.
*H04L 12/66* (2006.01)
*H04J 3/08* (2006.01)

(52) U.S. Cl. .................................... 370/463; 370/503
(58) Field of Classification Search ................ None
See application file for complete search history.

(56) References Cited

U.S. PATENT DOCUMENTS 5,305,312 A * 4/1994 Fornek et al. .............. 370/264
6,282,204 B1 * 8/2001 Balatoni et al. ............. 370/421

* cited by examiner

*Primary Examiner*—Duc Ho
(74) *Attorney, Agent, or Firm*—Sughrue Mion, PLLC

(57) ABSTRACT

A dual mode ISDN S/U interface converter and a network arrangement are provided. The dual mode ISDN S/U interface converter is capable of selectively operating in either line terminator (LT) or work terminator (NT) modes by an adjustment of jumpers or other electronic switches. The ISDN S/U interface converter also provides a selectable and reversible direction of sync flow over a common path, with a common sync circuit, common control, and common data bus. With the dual mode capability of the ISDN S/U converter, a system integrator can use a single type of equipment for insertion between an ISDN switch and a multiplexer.

38 Claims, 11 Drawing Sheets

Flow Chart for the Dual Mode S/U Interface Converter in the NT and LT mode

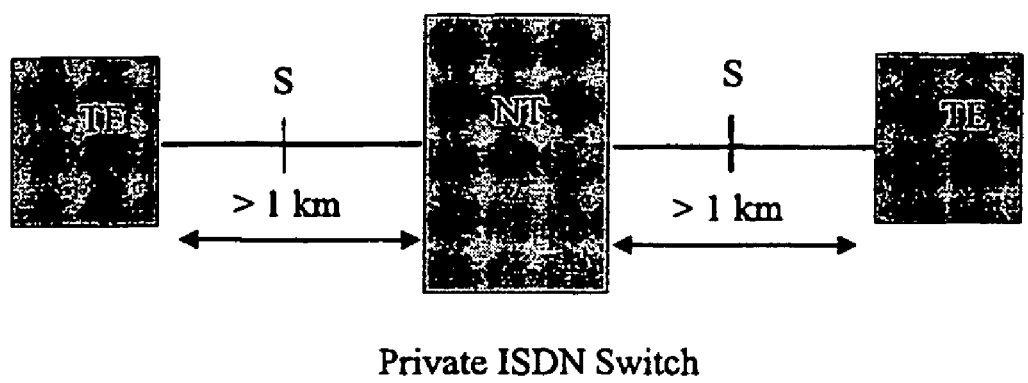
Figure 1. ISDN LAN User Access Model

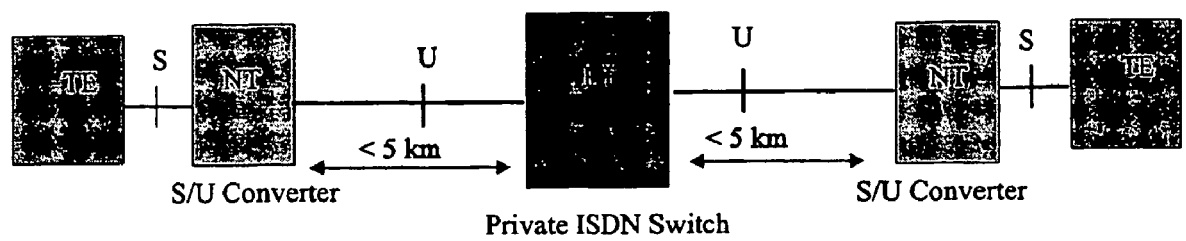
Figure 2a. ISDN LAN User Access for Longer Distance

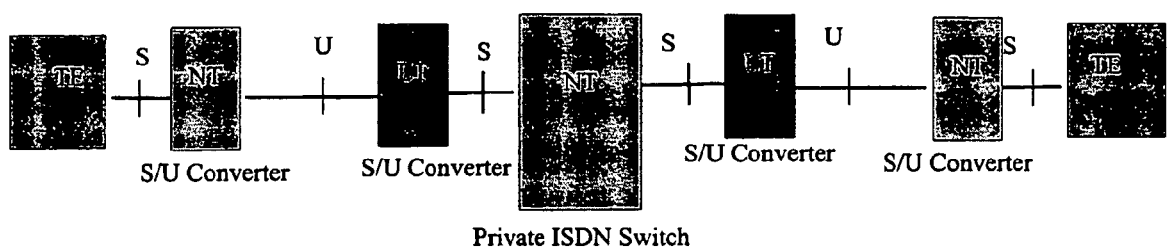
Figure 2b. ISDN LAN User Access for Longer Distance

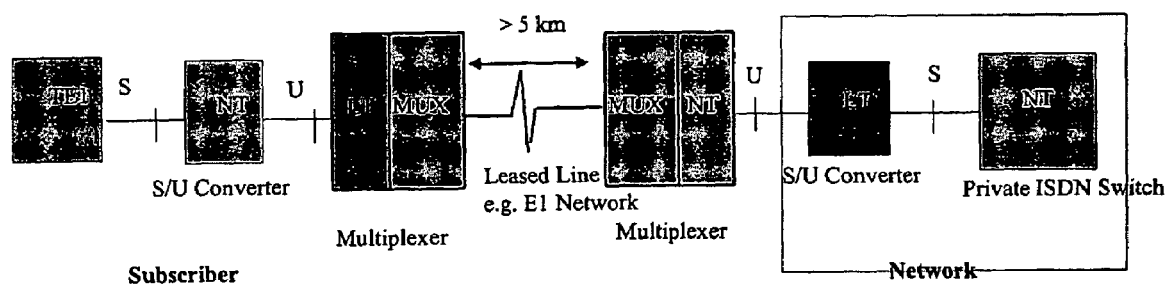
Figure 3. ISDN WAN User Access

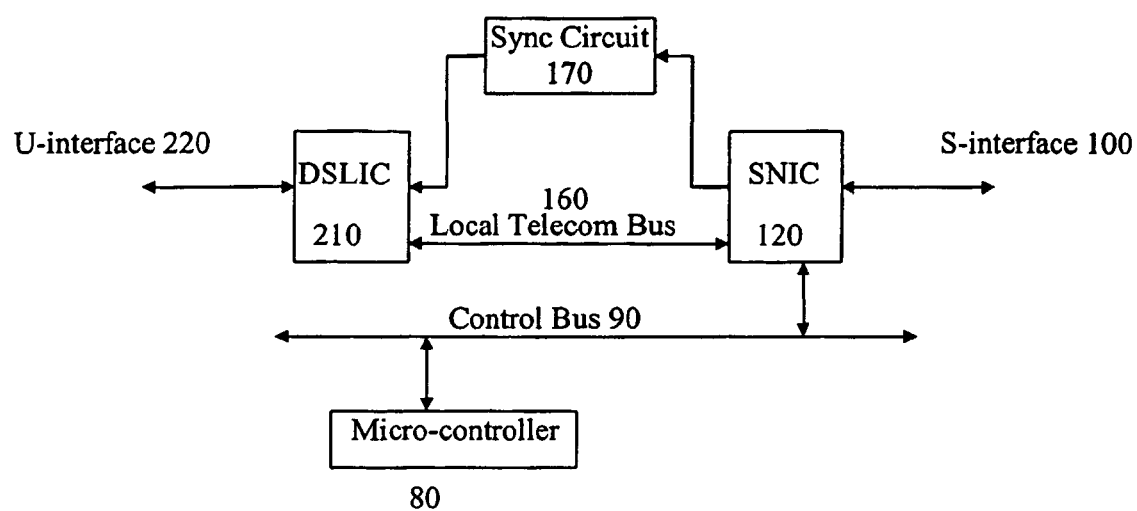
Figure 4a. Functional Block Diagram in LT Mode

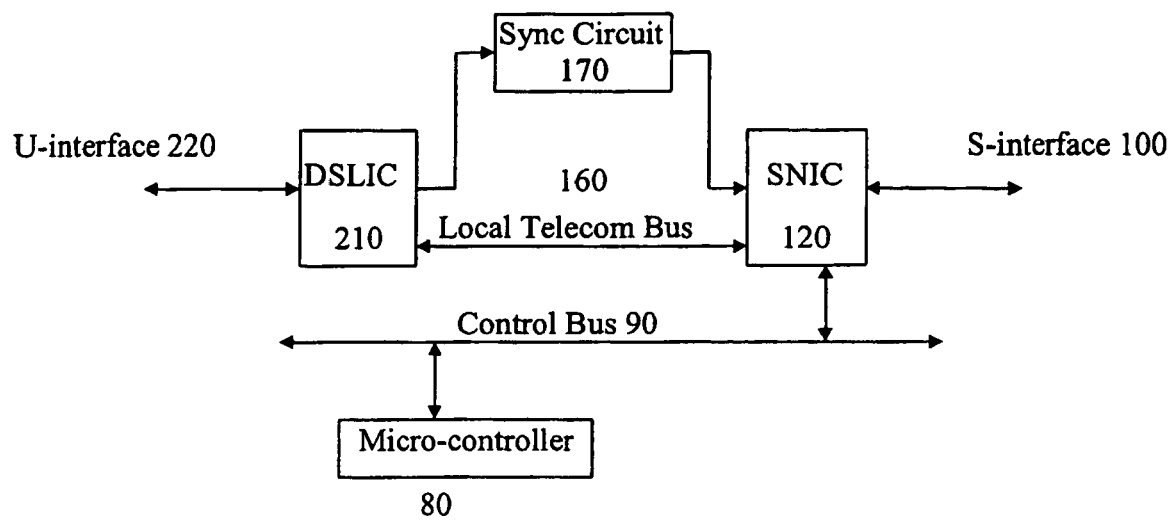
Figure 4b. Functional Block Diagram in NT Mode

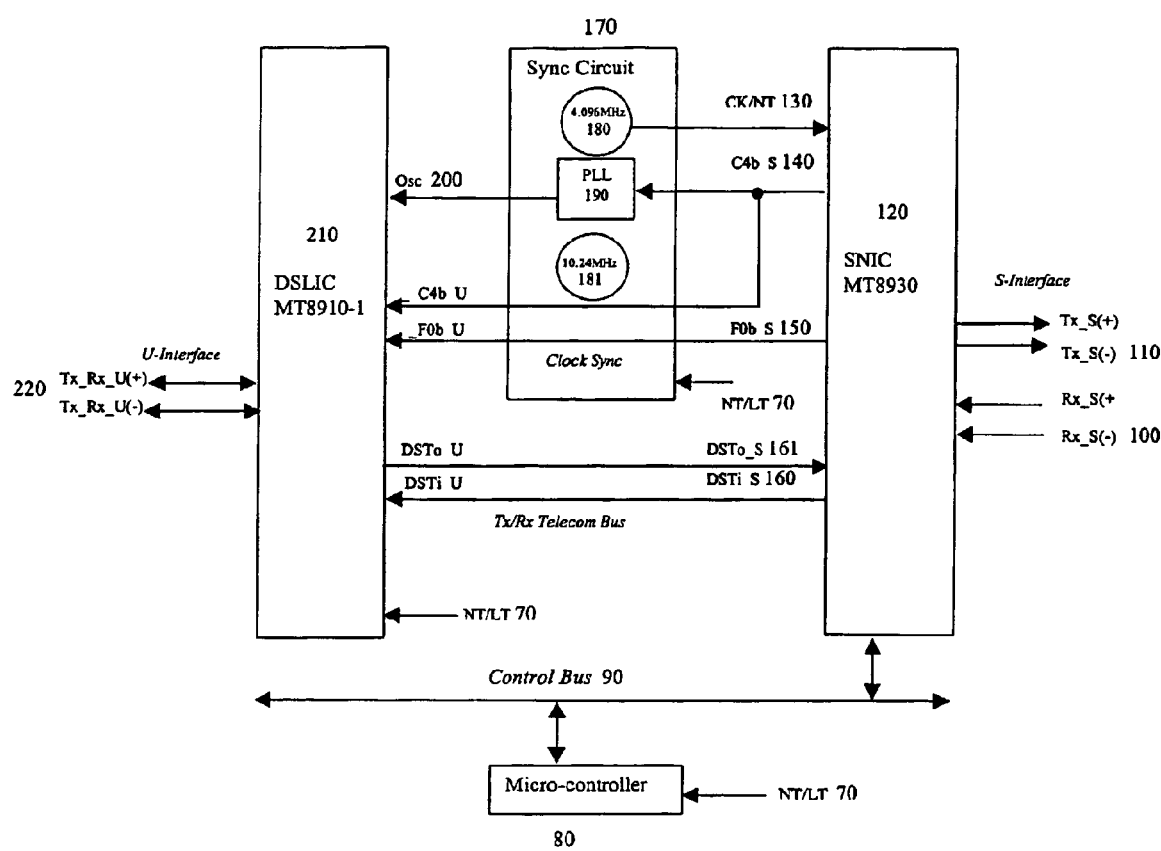
Figure 5a. S/U Converter Implementation in LT Mode

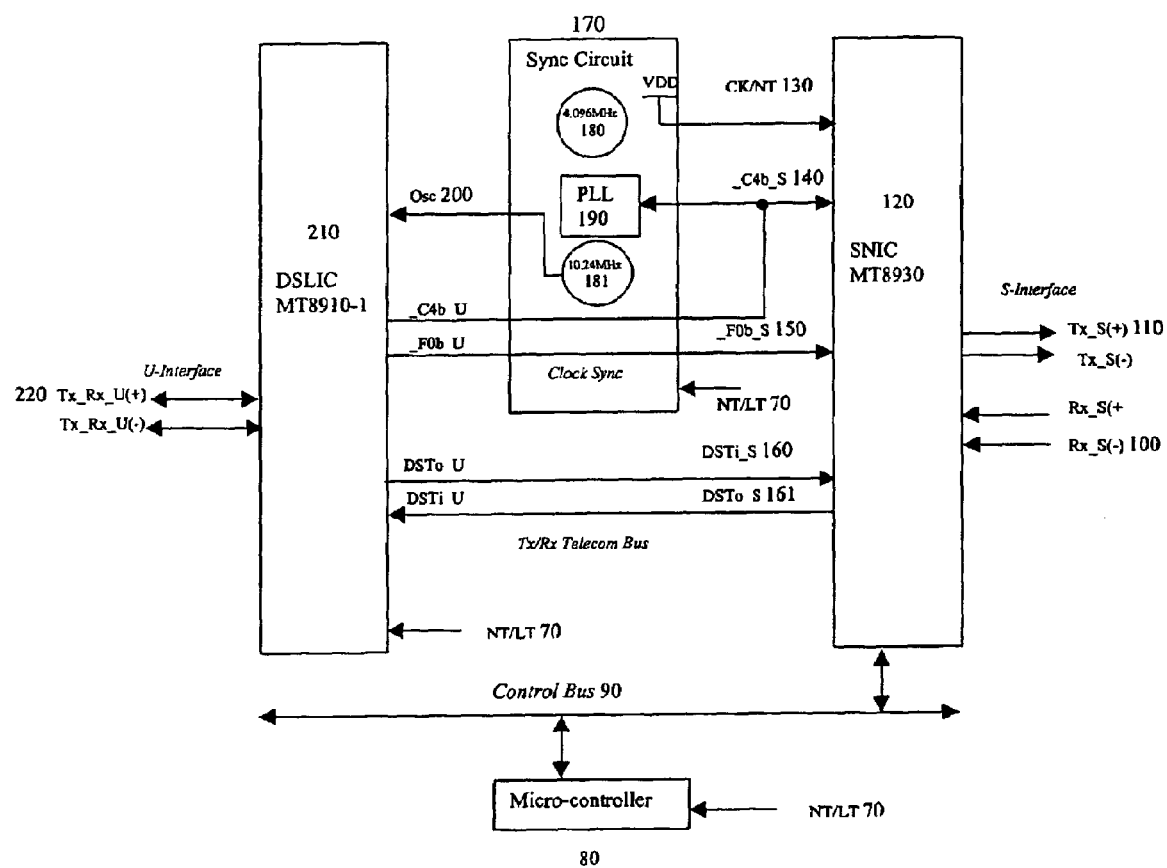
Figure 5b. S/U Converter Implementation in NT Mode

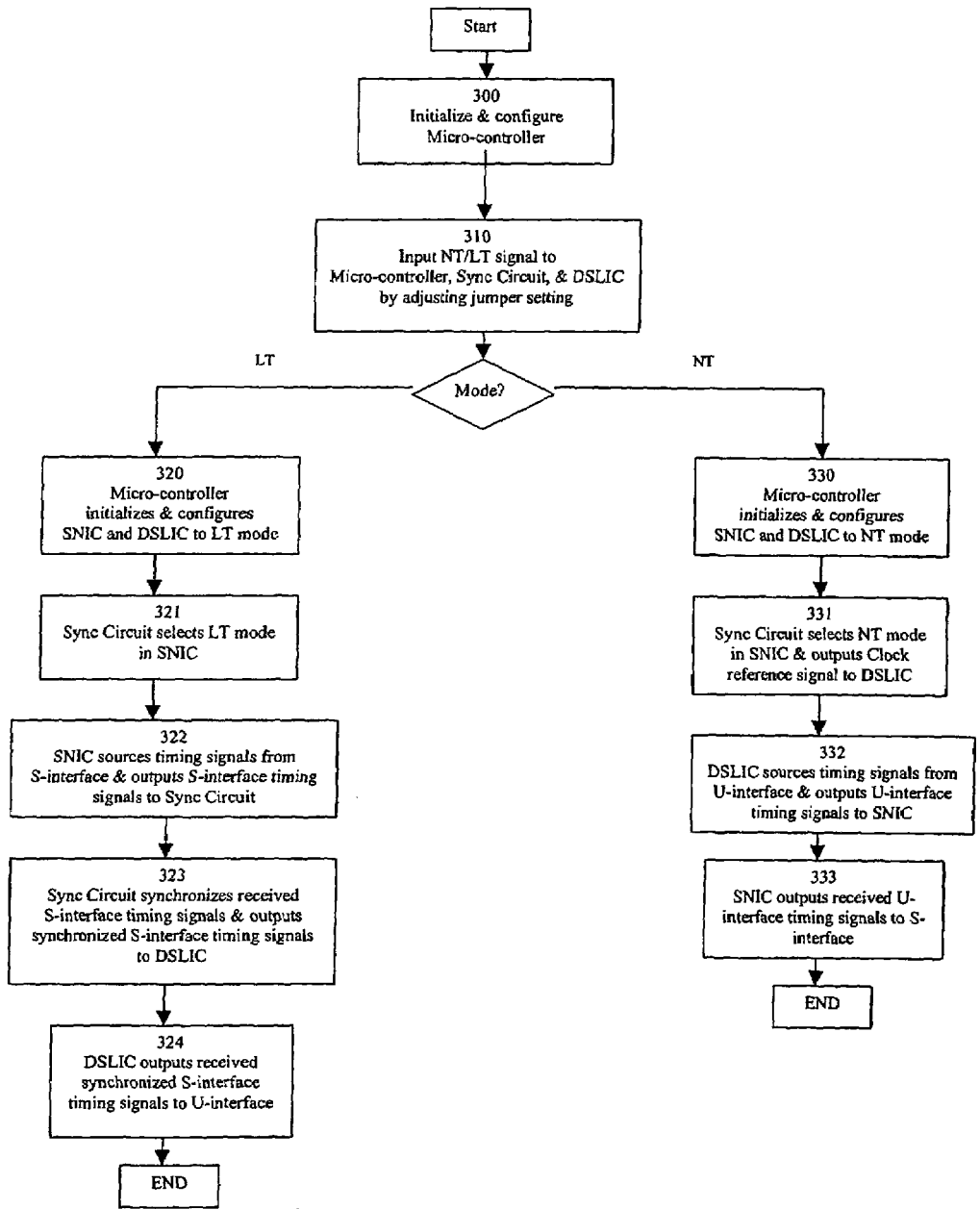
Figure 6. Flow Chart for the Dual Mode S/U Interface Converter in the NT and LT mode

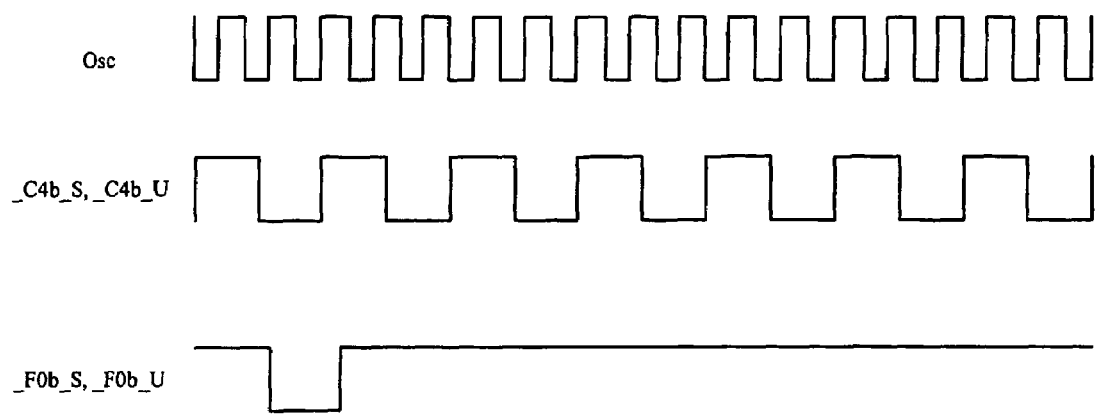
Figure 7a. Clock Sync Timing in LT Mode.
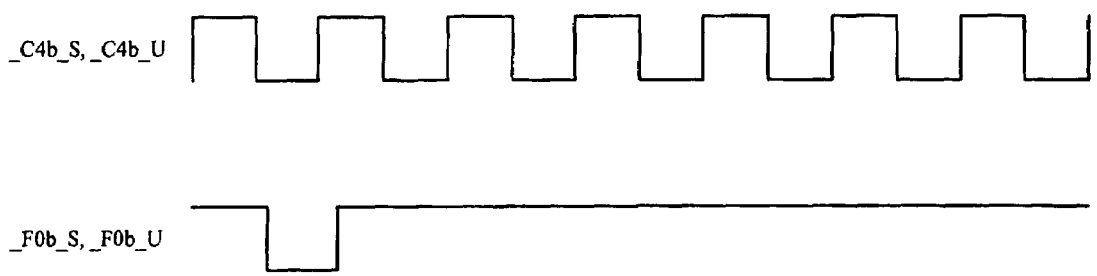
Figure 7b. Clock Sync Timing in NT Mode.

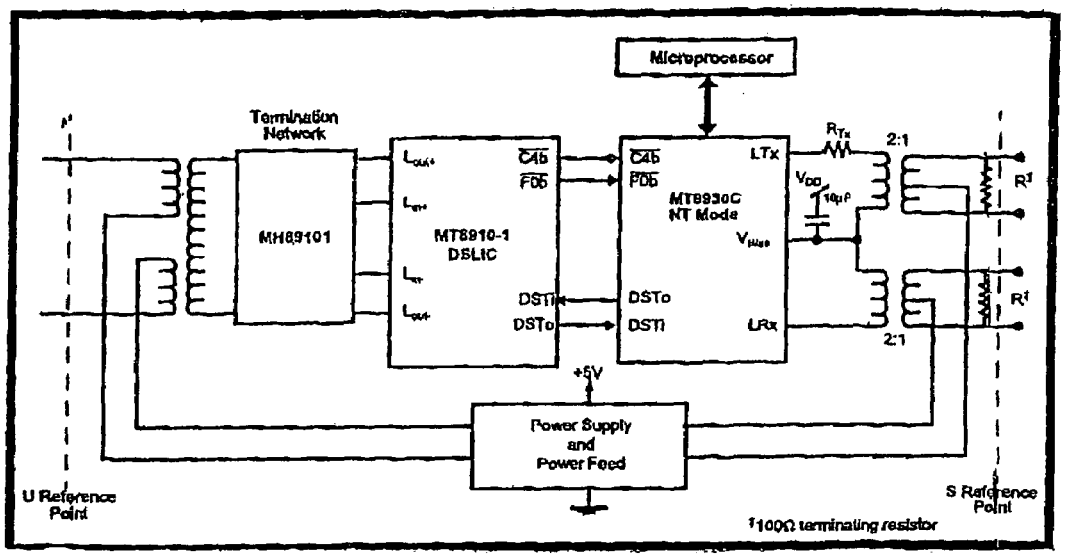
Figure 8. Conventional NT Mode S/U Interface Converter

DUAL MODE ISDN S/U INTERFACE CONVERTER

TECHNICAL FIELD

The present invention relates to telecommunication systems and more particularly to an integrated services digital network (ISDN) for providing an S/U interface converter that is capable of selectively operating in either network terminator (NT) or line terminator (LT) modes.

BACKGROUND

Integrated services digital networks (ISDN) allow users of a telephone network to exchange both voice signals and data in digital form rather than analog form. This is a global telecommunication service that uses digital transmission and switching technology to support both voice and data communication over the same twisted pair, and provide end-to-end digital connectivity. Telecommunication networks currently employ both conventional (i.e. analog) terminal equipment (TE), e.g., user premises device that serves as a data source, data sink, or both, and ISDN (digital) terminals.

The architecture of these telecommunication networks becomes more complicated as the distance between the TEs and the ISDN terminals increase. The complex configuration of these networks require several types of equipment to be inserted between the ISDN switch and a multiplexer that serves to bundle multiple signals into a suitable format for transmitting over a single communications channel. To better explain such complexity, the typical architecture of current telecommunication networks is described below.

As shown in FIG. 1, the network architecture for a private ISDN local area network (LAN) user access 10 typically uses a network terminal (NT) 11 as an ISDN switch. An ISDN switch is generally an interface that connects ISDN wire pairs. An example of an ISDN switch is a Private Branch Exchange (PBX). The NT 11 connects a 2-wire pair digital subscribe line (U-interface) from the exchange and converts it to a 4-wire pair (S interface). The NT 11 provides 4-wire S-interfaces (2B+D) 12 to interconnect multiple TEs 13 to form the LAN 10. Examples of a TE 13 are ISDN user premises devices such as ISDN telephones, data terminals, terminal adapters, etc. This network configuration 10, however, is only applicable if the distance between the NT 11 and the TE 13 is less that 1 km.

FIG. 2a illustrates a private ISDN LAN user access 20 where the distance between the ISDN switch 15 and the S/U converter 16 is greater than 1 km but less than 5 km. The network architecture of an ISDN LAN user access 20 at this distance typically uses an ISDN switch 15 that provides U-interfaces 14 instead of S-interfaces. It is also typical for the ISDN switch to assume the role of a line terminator (LT) 15 at the interface. A U-interface is a twisted pair subscriber loop that connects the Network Termination reference point to the ISDN network. Under U.S. regulations, a U-interface also marks the line of demarcation between customer-owned equipment and the public network. This network architecture 20 also requires S/U interface converters 16, each assuming the role of an NT, to interface with TEs 13.

FIG. 2b illustrates an alternative architecture to network 20 that may be used when the network architecture of a private ISDN LAN user access 30 does not contain an ISDN switch that provides a U-interface. Here, inserting S/U interface converters 17, each assuming the role of an LT, between S/U converters 16 and ISDN switch 9 solves the problem.

FIG. 3 illustrates network architecture for wide area networks (WAN) at distances greater than 5 km. Here, a U-interface 14 can be considered at the last kilometer, prior to the WAN network 41. At S-interface 12, a TE 13 is connected to an NT 16, acting as an S/U interface, to a multiplexer comprising an LT 18 and a MUX 19. In this arrangement, two S/U interface converters, one as an NT 16 and one as an LT 42, are employed in a manner similar to the network configuration of FIG. 2b. While an NT mode S/U interface converter 16 is readily available, an LT mode interface S/U converter 42 is not.

As provided in the Mitel MT8930C Subscriber Network Interface Circuit data sheet, FIG. 8 illustrates an example of an NT mode S/U interface converter. As shown in FIG. 8, components MT8930C subscriber network interface circuit (SNIC), MT8910-1 digital subscriber line interface circuit (DSLIC), and a Microprocessor form a conventional NT mode S/U interface converter. The Microprocessor initializes and configures the registers of the SNIC MT8930C and DSLIC MT8910-1 to NT mode. Upon initialization and configuration, the DSLIC MT8910-1 operates in a slave mode and sources timing signals from the U-interface. The DSLIC MT8910-1 then outputs the U-interface timing signals to the SNIC MT8930C. After receiving the U-interface timing signals, the SNIC MT8930C outputs the U-interface timing signals to the S-interface, acting as a master the S-interface. The conventional S/U interface converter of FIG. 8 is only operable in the NT mode and does not provide an option of operating in the LT mode.

An attempt to overcome this problem is to use an ISDN switch 9 that assumes the role of an LT with U-interface 17 as shown in FIG. 2b. However, for ISDN switches used in a LAN environment existing only with S-interfaces, it will not be possible to connect to a WAN network unless U-interface subscriber line cards 42, acting as LTs, are designed and implemented for each private ISDN switch 43. This approach is not economical because multiple separate line cards are required.

Another attempt to overcome this problem is to design an S-interface line card for the multiplexer 18, 19. In both cases, however, time and effort is required to design new subscriber interface cards, and the cost of implementing such design is high.

One object of the present invention is to provide an ISDN S/U interface converter that overcomes the above and other disadvantages of conventional ISDN S/U converters.

Another object of the present invention is to provide an ISDN S/U interface converter that shares a common hardware platform with hardware jumper configurations.

An additional object of the present invention is to provide an ISDN S/U interface converter that shares a common hardware platform with hardware jumper configurations and that can select the signal path and running firmware to perform the role as an LT or NT.

An even further object of the present invention is to provide an ISDN S/U interface converter that has a selectable and reversible direction of sync flow.

A still further object of the present invention is to provide an ISDN S/U interface converter that has a selectable and reversible direction of sync flow over a common path, with a common synchronization circuit, common control, and common data bas.

Another object of the present invention is to provide an ISDN S/U interface converter that provides an arrangement of such selectably configured structures together with links to local networks and long distance networks.

An additional object of the present invention is to provide an ISDN S/U interface converter that provides convenience, both economically and systematically, for a system integrator to use and maintain only one type of equipment.

Another object of the present invention is to provide an ISDN S/U interface converter that allows connectivity to WAN networks for switches used in LAN environments existing only with S-interface connections.

SUMMARY OF THE INVENTION

In order to achieve the above and other objects, a dual mode ISDN S/U interface converter and a network arrangement containing such dual mode ISDN S/U interface converter is provided. The dual mode ISDN S/U interface converter comprises: a digital subscriber line interface circuit (DSLIC) for communication with the U-type signals utilized on 2-wire digital subscriber line connections, a subscriber network interface circuit (SNIC) for communication with the S-type signals utilized on 4-wire (2B+D) digital connections, a switchable synchronization circuit (Sync Circuit) that can provide sync signals between the DSLIC and SNIC, and a micro-controller, together with some memory peripherals.

BRIEF DESCRIPTION OF THE DRAWINGS

The above and other objects and advantages of the present invention will become more apparent by describing in detail preferred embodiments thereof with reference to the attached drawings in which:

FIG. 1 shows a conventional ISDN LAN User Access Model;

FIG. 2a shows an ISDN LAN User Access Model for Longer Distance;

FIG. 2b shows an ISDN LAN User Access Model for Longer Distance, where the ISDN switch does not provide a U-interface;

FIG. 3 shows an ISDN WAN User Access Model;

FIG. 4a shows a functional block diagram of an S/U Interface Converter in LT mode;

FIG. 4b shows a functional block diagram of an S/U Interface Converter in NT mode;

FIG. 5a shows an Implementation of the Dual Mode S/U Interface Converter in LT mode.

FIG. 5b shows an Implementation of the Dual Mode S/U Interface Converter in NT mode.

FIG. 6 shows a Flow Chart for the S/U Interface Converter in the NT and LT mode.

FIG. 7a shows Clock Sync Timing in LT mode.

FIG. 7b shows Clock Sync Timing in NT mode.

FIG. 8 shows a Conventional NT mode S/U Interface Converter

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

The present invention relates to an ISDN converter for providing an S/U interface that is capable of selectively operating in either line terminator (LT) or work terminator (NT) modes. In addition, the ISDN S/U interface converter provides a selectable and reversible direction of sync flow over a common path, with a common Sync Circuit, common control, and common data bus.

In an illustrative, non-limiting embodiment of the present invention, as illustrated in FIGS. 4a and 4b, a stand alone dual mode ISDN S/U interface converter 50 is capable of selectively operating in either LT or NT modes by an adjustment of jumpers or other electronic switches to a high or low voltage input (not shown). The standalone dual mode ISDN S/U interface converter, which uses a common hardware platform and provides for sharing of two functions by the use of selectable hardware jumper configurations, can have signal path and running firmware that is appropriate for LT or NT operation selected in response to hardware jumper adjustment. With the dual mode capability of the ISDN S/U converter, a system integrator can use a single type of equipment for insertion between an ISDN switch and a multiplexer.

As illustrated in FIGS. 4a and 4b, the circuit 50 contains a digital subscriber line interface circuit (DSLIC) 210 for communication with the U-type signals 220 utilized on 2-wire digital connections, a subscriber network interface circuit (SNIC) 120 for communication with the S-type signals 100 utilized on 4-wire (2B+D) digital connections, a switchable synchronization circuit (Sync Circuit) 170 that can provide Clock sync signals between the DSLIC 210 and SNIC 120, and a Micro-controller 80, together with some memory peripherals, a control bus 90, and a local telecom bus 160.

The major difference between the LT and NT mode of the ISDN S/U interface converter 50 is the source of clock synchronization. In LT mode, timing signals are sourced from the S-interface 100, via the SNIC 120, and supplied to the U-interface 220, as shown in FIG. 4a. In the NT mode, timing signals for the converter 50 are sourced from the U-interface 220, via the DSLIC 210, and supplied to the S-interface 110, as shown in FIG. 4b.

FIG. 6 provides a flow chart diagram of a Dual Mode S/U Interface Converter in the NT and LT mode. At the commencement of operation, the Micro-controller is initialized and configured (300) and a high or low input NT/LT signal is input, by an adjustment of the converter jumper settings, to the Micro-controller, Sync Circuit, and DSLIC (310). The Micro-controller reads the NT/LT input signal and initiates and configures the SNIC and DSLIC to the appropriate selected mode (320, 330). When the S/U Interface converter is operating in the LT mode, the Sync Circuit selects the appropriate mode of the SNIC (321). Upon LT mode selection, the SNIC sources timing signals from the S-interface and outputs the S-interface timing signals to the Sync Circuit (322). The Sync Circuit synchronizes the received S-interface timing signals and outputs the synchronized S-interface timing signals to the DSLIC (323). Once the synchronized S-interface timing signals are received, the DSLIC outputs the synchronized S-interface timing signals to the U-interface (324). When the S/U Interface converter is operating in the NT mode, the Sync Circuit selects the appropriate mode of the SNIC and outputs a clock reference signal to the DSLIC (331). Upon receiving the clock reference signal, the DSLIC sources timing signals from the U-interface and outputs the U-interface timing signals to the SNIC (332). Once the synchronized U-interface timing signals are received, the SNIC outputs the synchronized U-interface timing signals to the S-interface (333).

FIGS. 7a and 7b show the clock sync timing for a S/U Interface Converter in the LT and NT mode, respectively. As shown in FIG. 7a, the C4b_S, C4b_U and Osc clock signals are frequency locked in the LT mode to a strict phase relationship. In the NT mode, the strict phase relationship for the C4b_S, C4b_U and Osc is not required, as shown in FIG. 7b.

A more detailed, non-limiting embodiment of the present invention, is illustrated in FIGS. 5a and 5b, where the Clock/Network Termination Mode Select Input (CK/NT) 130, clock signals C4b_S, C4b_U 140, frame pulse signals F0b_S, F0b_U 150, free running oscillators 180 and 181, phased locked loop (PLL) 190, oscillator input (Osc) 200, and the NT/LT switching signals 70, as provided by the hardware jumper configuration, are also shown. The hardware jumper configurations may be provided as a variety of known selectable electronic hardware switches or software switches, as would be known in the art.

In a preferred embodiment, the hardware jumper configurations control the clock synchronization by selecting appropriate firmware in the micro-controller 80 and signal path. Upon reading the hardware jumper configurations, the firmware decides whether to configure the DSLIC 210 and the SNIC 120 circuits as NT or LT mode. The direction of clock synchronization for the converter 50 is determined by controlling the direction of the signal flow of a bi-directional buffer (not shown) in the Sync Circuit 170, in response to the jumper setting NT/LT input signal 70.

As illustrated in FIGS. 5a and 5b, the selection of the NT/LT mode for the ISDN S/U converter 50 is initialized by inputting a High or Low signal NT/LT input voltage 70 to the Micro-controller 80, DSLIC 210, and the Sync Circuit 170, using the jumper link selection.

The Micro-controller 80 provides the necessary control required by the various circuits via the Control Bus 90, as illustrated in FIGS. 5a and 5b. Throughout start up and operation, the Micro-controller 80 reacts according to the status and line condition scenarios of the S interface 100, 110 and U interface 220. For NT mode, the U-interface 220 is first activated before the S-interface 100, 110; activation is in the reverse for the case of the LT mode. Upon reading the NT/LT signal input 70, the Micro-controller 80 executes the firmware/software in accordance with the selected mode. By way of the Control Bus 90, the Micro-controller 80 initializes and configures the operational mode of the SNIC 120 register to the selected mode of the converter 50. By way of the SNIC 120 and the local telecom bus 160, 161, the Micro-controller 80 initializes and configures the operational mode of the DSLIC 210 register to the selected mode of the converter 50.

Also shown in FIGS. 5a and 5b, the SNIC 120 provides both the physical and functional interface to the ISDN subscriber using an existing 4wire circuit. The SNIC 120 is implemented by a chipset that performs all necessary functions required to support the S-interface 100, 110 including, line activation/deactivation, bus arbitration, etc. Such a SNIC 120 can be realized, but is not limited to, in terms of Mitel MT8930 or equivalent chipset. The Sync Circuit 170 selects the mode of operation for the SNIC 120 by setting the CK/NT input 130 to either a 4.096 MHz clock signal 180 for the LT mode or a High Voltage input (VDD) for the NT mode.

The DSLIC 210 provides both the physical and functional interface to the ISDN subscriber using an existing 2-wire circuit, as shown in FIGS. 5a and 5b. The DSLIC 210 is implemented by a chipset which performs all necessary functions required to support the U-interface 220 including, line activation/deactivation, line training, echo cancellation, CRC check, data packaging, etc. Such a DSLIC can be realized, but is not limited to, in terms of a Mitel MT8910 or equivalent chipset. Mode configuration of the DSLIC 210 is selected by Micro-controller 80. Upon reading the NT/LT 70 input signal, the Micro-controller 80 writes to the SNIC 120 register via Control Bus 90, which in turn configures the DSLIC 210 to LT or NT mode via the Tx/Rx Telecom Bus 160, 161.

The local telecom bus 160, 161 provides a common data transfer bus between the DSLIC 210 and the SNIC 120 for data such as 2B+D and other control signals. Such a bus can be realized, but is not limited to, a Mitel ST-Bus or IOM-Bus, which are commercially available.

The Sync Circuit 170 makes the duality of the S/U interface converter possible. By selecting the direction of flow of the Clock Sync, the Sync Circuit 170 completes the selection of the NT/LT mode for the ISDN S/U converter 50. As shown in FIGS. 5a and 5b, the Sync Circuit 170 provides the direction of signal flow for timing signals C4b_S, C4b_U 140 and F0b_S, F0b_U 150 via a bi-directional buffer in response to the NT/LT input 70. In FIG. 5a, the Sync Circuit 170 synchronizes and multiplies timing signal C4b_S 140. The Sync Circuit 170 allows the signal path direction of timing signals C4b_S, C4b_U 140 and F0b_S, F0b_U 150 to change in accordance to the selected mode of operation for the converter 50. The Sync Circuit 170 also allows the input option of the SNIC's 120 CK/NT 130 pin to be either a free running 4.096 MHz clock signal 180 in the LT mode or a high input voltage in the NT mode. Upon reading the NT/LT signal input 70, the Sync Circuit 170 selects the NT/LT mode in the SNIC 120 by inputting one of two different signals to CK/NT input 130, one input being a 4.096 MHz signal for the LT mode and the other input being a high voltage signal for the NT mode. In addition, the Sync Circuit 170 also allows the input option of the DSLIC's 210 Osc 200 pin to be either a 10.24 MHz signal derived from the timing signal C4b_S 140 in the LT mode or a free running 10.24 MHz clock signal 181 in the NT mode.

FIG. 5a illustrates a preferred embodiment of the S/U interface converter in the LT mode. The S-interface 110, 110 is closer to the network and the U-interface 220 is closer to the TEs. The U-interface 220 is therefore synchronized to the S-interface 100, 110 to maintain data transmission integrity. In LT mode, timing is sourced from the S-interface signals 100 and supplied to the U-interface 220. To achieve synchronization in the LT mode, a signal generated by the Sync Circuit's 170 free running clock 180, which may be running at 4.096 MHz, is supplied to the SNIC 120 via the CK/NT input 130. The free running clock signal 130 serves as a reference clock for the SNIC's 120 internal phase-locked loop (PLL) (not shown). The SNIC's 120 internal PLL extracts timing from the S-interface Rx_S signal 100 (4.096 MHz) and generates timing signals C4b_S 140 and F0b_S 150. The SNIC 120 outputs the timing signals C4b_S 140 and F0b_S 150 to the Sync Circuit 170. The PLL 190 multiplies timing signal C4b_S 140 to 10.24 MHz and then supplies the higher rate signal to the DSLIC 210 via the Osc input 200. The PLL 190 can be realized, but is not limited to, in terms of the Texas Instruments CD74HC4046A. The DSLIC 210 then outputs the S-synchronized timing signal to the U-interface 220.

FIG. 5b illustrates a preferred embodiment of the S/U interface converter in the NT mode. The U-interface 220 is closer to the network and the S-interface 100, 110 is closer to the TEs. Data transmission integrity for the converter 50 is maintained by synchronizing the S-interface 100, 110 to the U-interface 220. To achieve synchronization, the Sync Circuit 170 supplies a high input signal 180 to the SNIC 120 via the CK/NT input 130 and a free running 10.24 MHz clock signal 181 to the Osc input 200 of the DSLIC 210. The signal provided by the free running 10.24 MHz clock 181 serves as a reference clock for the DSLIC's 210 internal PLL (not shown). Timing for the converter 50 is sourced from U-interface signals 220 by the DSLIC 210. The DSLIC 210 then outputs the U-interface timing signals C4b_U 140 and F0b_U 150 to the SNIC 120. The SNIC 120 then outputs the synchronized U-interface timing signals to the S-interface 100, 110.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed is:

1. An S/U converter comprising:
   a subscriber network interface circuit for receiving and transmitting S-type signals utilized on 4-wire digital connections, said circuit comprising a first source of timing signals that is responsive to received S-type signals;
   a digital subscriber line interface circuit for receiving and transmitting U-type signals utilized on 2-wire digital connections, said circuit comprising a second source of timing signals that is responsive to received U-type signals;
   a sync circuit, connected between said subscriber network interface circuit and said digital subscriber line interface circuit and being operable in a first mode and a second mode, in said first mode, said sync circuit receives a first timing signal from said first source of timing signals and in response to said first source timing signals generates and provides a second timing signal to said digital subscriber line interface circuit, and in said second mode, said sync circuit provides a third timing signal to said digital subscriber line interface circuit;
   and a controller operative to determine the mode of the converter and control the activation of said circuits.

2. The S/U converter as set forth in claim 1, wherein each of said sync circuit, said subscriber network interface circuit, said digital subscriber line interface circuit and said controller are responsive to a NT/LT selection signal to provide operation in said first mode or said second mode.

3. The S/U converter as set forth in claim 1, wherein said sync circuit comprises a selectable jumper for switching between said first mode and said second mode.

4. The S/U converter as set forth in claim 1, wherein said subscriber network interface circuit, said digital subscriber line interface circuit and said sync circuit share a common hardware platform.

5. The S/U converter as set forth in claim 1, wherein said sync circuit selects a first and a second direction of flow for clock synchronization responsive to operation of said sync circuit in a first mode or second mode, respectively.

6. The S/U converter as set forth in claim 1, wherein said first mode is an LT mode, and said second mode is an NT mode.

7. The S/U converter as set forth in claim 6, wherein said controller is operative to start up the U-interface before the S-interface in the NT mode and to start up the S-interface before the U-interface in the LT mode.

8. The S/U converter as set forth in claim 1, wherein said first source of timing signals is an S-interface and said second source of timing signals is a U-interface.

9. The S/U converter as set forth in claim 1, further comprising a first free running oscillator, said first free running oscillator generating a reference signal and a second free running oscillator, said second free running oscillator generating said third timing signal.

10. The S/U converter as set forth in claim 9, wherein said sync circuit provides said reference signal to said subscriber network interface circuit in said first mode and a high voltage signal to said subscriber network interface circuit in said second mode.

11. The S/U converter as set forth in claim 1, wherein said sync circuit further comprises a phase locked loop responsive to said first timing signal to provide said second timing signal.

12. The S/U converter as set forth in claim 1, further comprising a local telecom bus connecting said subscriber network interface circuit and said digital subscriber line interface circuit.

13. The S/U converter as set forth in claim 12, wherein said local telecom bus comprises a first and a second bus, each for carrying frame sync information.

14. A communications network comprising:
    an ISDN switch;
    a multiplexer; and
    a dual mode S/U converter, disposed between said ISDN switch and said multiplexer and being selectably switched between a first mode and a second mode, said S/U converter comprising:
    a subscriber network interface circuit for receiving and transmitting S-type signals utilized on 4-wire digital connections, said circuit comprising a first source of timing signals that is responsive to received S-type signals;
    a digital subscriber line interface circuit for receiving and transmitting U-type signals utilized on 2-wire digital connections, said circuit comprising a second source of timing signals that is responsive to received U-type signals;
    a sync circuit, connected between said subscriber network interface circuit and said digital subscriber line interface circuit and being operable in a first mode and a second mode, in said first mode, said sync circuit receives a first timing signal from said first source of timing signals and in response to said first source timing signals generates and provides a second timing signal to said digital subscriber line interface circuit, and in said second mode, said sync circuit provides a third timing signal to said digital subscriber line interface circuit;
    and a controller operative to determine the mode of the converter and control the activation of said circuits.

15. The communications network as set forth in claim 14, wherein each of said sync circuit, said subscriber network interface circuit, said digital subscriber line interface circuit and said controller are responsive to a NT/LT selection signal to provide operation in said first mode or said second mode.

16. The communications network as set forth in claim 14, wherein said sync circuit comprises a selectable jumper for switching between said first mode and said second mode.

17. The communications network as set forth in claim 14, wherein said subscriber network interface circuit, said digital subscriber line interface circuit and said sync circuit share a common hardware platform.

18. The communications network as set forth in claim 14, wherein said sync circuit selects a first and second direction of flow for clock synchronization responsive to operation of said sync circuit in a first mode or second mode, respectively.

19. The communications network as set forth in claim 14, wherein said first source of timing signals is an S-interface and said second source of timing signals is a U-interface.

20. The communications network as set forth in claim 14, wherein said first mode is a LT mode and said second mode is an NT mode.

21. The communications network as set forth in claim 20, wherein said controller is operative to start up the U-interface before the S-interface in the NT mode and to start up the S-interface before the U-interface in the LT mode.

22. The communications network as set forth in claim 14, further comprising a first free running oscillator, said first free running oscillator generating a reference signal and a second free running oscillator, said second free running oscillator generating said third timing signal.

23. The communications network as set forth in claim 22, wherein said sync circuit provides said reference signal to said subscriber network interface circuit in said first mode and a high voltage signal to said subscriber network interface circuit in said second mode.

24. The communications network as set forth in claim 14, wherein said sync circuit further comprises a phase locked loop responsive to said first timing signal to provide said second timing signal.

25. The communications network as set forth in claim 14, further comprising a local telecom bus connecting said subscriber network interface circuit and said digital subscriber line interface circuit.

26. The communications network as set forth in claim 25, wherein said local telecom bus comprises a first and a second bus, each for carrying frame sync information.

27. A method of operating a dual mode S/U converter comprising:
  receiving and transmitting S-type signals utilized on 4-wire digital connections on a subscriber network interface circuit, said circuit comprising a first source of timing signals that is responsive to received S-type signals;
  receiving and transmitting U-type signals utilized on 2-wire digital connections on a digital subscriber line interface circuit, said circuit comprising a second source of timing signals that is responsive to received U-type signals;
  operating a sync circuit between said subscriber network interface circuit and said digital subscriber line interface circuit in a first mode wherein a first timing signal from said first source of timing signals is received and a second timing signal is outputted to said digital subscriber line interface circuit, and in a second mode wherein a third timing signal is provided to said digital subscriber line interface circuit; and operating a controller to determine the mode of the converter and control the activation of said circuits.

28. The method as defined in claim 27, further comprising selecting a NT/LT signal, wherein the operation in said first mode or said second mode to each of said sync circuit, said subscriber network interface circuit, said digital subscriber line interface circuit and said controller is responsive to the said NT/LT signal.

29. The method as defined in claim 27, further comprising selecting a direction of flow for clock synchronization by said sync circuit.

30. The method as defined in claim 27, further comprising switching between said first mode and said second mode by the sync circuit.

31. The method as defined in claim 27, wherein said first mode is an LT mode, and said second mode is an NT mode.

32. The method as defined in claim 27, further comprising operating said controller, wherein said method for operating comprises a method for initiating the U-interface before the S-interface in the NT mode and initiating the S-interface before the U-interface in the LT mode.

33. The method as defined in claim 27, further comprising generating a reference signal in the sync circuit and generating said third timing signal in the sync circuit.

34. The method as defined in claim 33, further comprising inputting said reference signal to said subscriber network interface circuit in said first mode and inputting a high voltage signal to said subscriber network interface circuit in said second mode.

35. The method as defined in claim 27, said sync circuit further comprising inputting said first timing signal into a phase locked loop and producing said second signal.

36. The method as defined in claim 27, wherein said first source of timing signals is an S-interface and said second source of timing signals is a U-interface.

37. A method of managing a communications network having at least one dual mode S/U controller, ISDN switch, and multiplexer, said S/U converter comprising a method for
  receiving and transmitting S-type signals utilized on 4-wire digital connections on a subscriber network interface circuit, said circuit comprising a first source of timing signals that is responsive to received S-type signals;
  receiving and transmitting U-type signals utilized on 2-wire digital connections on a digital subscriber line interface circuit, said circuit comprising a second source of timing signals that is responsive to received U-type signals;
  operating a sync circuit connected between said subscriber network interface circuit and said digital subscriber line interface circuit, a first mode and a second mode; and
  receiving a first timing signal from said first source of timing signals while in said first mode, generating and providing a second timing signal to said digital subscriber line interface circuit while in said first mode, and providing a third timing signal to said digital subscriber line interface circuit while in said second mode.

38. The method defined in claim 37 further comprising operating a controller to determine the mode of the converter and control the activation of said circuits.

* * * * *